US008762522B2

(12) United States Patent
Moon (10) Patent No.: US 8,762,522 B2
(45) Date of Patent: Jun. 24, 2014

(54) COORDINATING DATA CENTER COMPUTE AND THERMAL LOAD BASED ON ENVIRONMENTAL DATA FORECASTS

(75) Inventor: Billy G. Moon, Cary, NC (US)

(73) Assignee: Cisco Technology, San Jose, CA (US)

( * ) Notice: Subject to any disclaimer, the term of this patent is extended or adjusted under 35 U.S.C. 154(b) by 269 days.

(21) Appl. No.: 13/089,902

(22) Filed: Apr. 19, 2011

(65) Prior Publication Data

US 2012/0271935 A1 Oct. 25, 2012

(51) Int. Cl.
*G06F 15/173* (2006.01)

(52) U.S. Cl.
USPC ........................................................ 709/224

(58) Field of Classification Search
USPC ......... 709/203, 223, 224, 226, 208, 217, 225, 709/229, 232
See application file for complete search history.

(56) References Cited

U.S. PATENT DOCUMENTS

| | | | | |
|---|---|---|---|---|
| 7,551,971 | B2 * | 6/2009 | Hillis | 700/90 |
| 8,209,993 | B2 * | 7/2012 | Carlson et al. | 62/259.2 |
| 8,224,993 | B1 * | 7/2012 | Brandwine | 709/244 |
| 8,245,059 | B2 * | 8/2012 | Jackson | 713/300 |
| 8,397,088 | B1 * | 3/2013 | Ghose | 713/300 |
| 8,560,677 | B2 * | 10/2013 | VanGilder et al. | 709/224 |
| 2005/0114507 | A1 * | 5/2005 | Tarui et al. | 709/224 |
| 2005/0228618 | A1 * | 10/2005 | Patel et al. | 702/188 |
| 2006/0112286 | A1 * | 5/2006 | Whalley et al. | 713/300 |
| 2006/0259621 | A1 * | 11/2006 | Ranganathan et al. | 709/226 |
| 2007/0078635 | A1 * | 4/2007 | Rasmussen et al. | 703/1 |
| 2007/0150215 | A1 * | 6/2007 | Spitaels et al. | 702/61 |
| 2007/0174024 | A1 * | 7/2007 | Rasmussen et al. | 703/1 |
| 2007/0271475 | A1 * | 11/2007 | Hatasaki et al. | 713/324 |
| 2008/0174954 | A1 * | 7/2008 | VanGilder et al. | 361/687 |
| 2009/0138313 | A1 * | 5/2009 | Morgan et al. | 705/8 |
| 2009/0265568 | A1 * | 10/2009 | Jackson | 713/320 |
| 2010/0211669 | A1 * | 8/2010 | Dalgas et al. | 709/224 |
| 2010/0211810 | A1 * | 8/2010 | Zacho | 713/324 |
| 2010/0292976 | A1 * | 11/2010 | Newcombe et al. | 703/13 |
| 2011/0055604 | A1 * | 3/2011 | Jackson | 713/320 |
| 2011/0055605 | A1 * | 3/2011 | Jackson | 713/320 |
| 2011/0215645 | A1 * | 9/2011 | Schomburg et al. | 307/65 |
| 2012/0013141 | A1 * | 1/2012 | Cheng | 296/24.3 |
| 2012/0030347 | A1 * | 2/2012 | Hsu et al. | 709/224 |
| 2012/0310765 | A1 * | 12/2012 | Masters | 705/26.3 |
| 2013/0025842 | A1 * | 1/2013 | Carlson et al. | 165/287 |

OTHER PUBLICATIONS

Author 9797, "Building a Telecom Data Center," whytelecom.com, Sep. 2009: pp. 1-7, <http://whytelecom.com/content/building-telecom-data-center-0>.
Sandra Waenlink, "Coolboxx Purchases WAM-R," Mark-It Services, 2009: pp. 1-3, <http://www.mark-itservices.com/200907-coolboxx-wamr.html>.

(Continued)

*Primary Examiner* — Sargon Nano
(74) *Attorney, Agent, or Firm* — Patterson & Sheridan LLP (57) ABSTRACT

The present disclosure describes techniques evaluating compute and/or thermal loads (among other things) to aid in managing a collection of one or more containerized or modular data centers. For example, forecasts (or real-time measurements) of environmental factors (as well as projected computing demands) may be used to tailor the compute loads, cooling strategies or other metric of data center operations for a network of containerized or modular data centers. Doing so allows an operator of such a data center network to manage specific operational goals in real time.

21 Claims, 4 Drawing Sheets

(56) References Cited

OTHER PUBLICATIONS

Chris Robertson et al., "Data Centers, Power, and Pollution Prevention: Design for Business and Environmental Advantage," Center for Energy & Climate Solutions, Jun. 2002: pp. 1-16, <http://files.harc.edu/Sites/GulfCoastCHP/Publications/DataCentersBusinessEnvironmentalAdvantage.pdf>.

"Google Data Centers," Google Corporate Information: pp., <http://www.google.com/corporate/datacenter/index.html>.

David Moss, "Guidelines for Assessing Power and Cooling Requirements in the Data Center," Dell Power Solutions, Aug. 2005: pp. 65-65, <http://www.dell.com/downloads/global/power/ps3q05-20050115-Moss.pdf>.

David Ohara, "HP Butterfly Flexible Data Center, Part 2—20 year NPV 37% lower than traditional," Green Data Center Blog, Jul. 2010: pp. <http://www.greenm3.com/2010/07/hp-butterfly-flexible-data-center-part-2---20-year-npv-37-lower-than-traditional.html>.

"SkyBitz Brings Reefers Into Play With Star Trak," SatNews.com, SatNews Daily: pp. 1-2, <http://www.satnews.com/cgi-bin/display_story.cgi?number=759130674>.

* cited by examiner

COORDINATING DATA CENTER COMPUTE AND THERMAL LOAD BASED ON ENVIRONMENTAL DATA FORECASTS

TECHNICAL FIELD

Embodiments presented in this disclosure generally relate to techniques for using environmental data to optimize data center operations.

BACKGROUND

Modern data centers frequently house thousands of individual server computer systems. A data center typically includes racks of server computers, network communication cables connecting the servers (and the data center) to other networks, as well as environmental controls used to maintain an adequate operating environment—in particular, systems to manage heating, cooling, water and power consumption. Further, given that large information technology (IT) operations are a critical aspect of many enterprises, data centers frequently include redundant systems for power (e.g., emergency backup power generation) HVAC and networking systems.

Given their expense, complexity, and importance, extensive preparation goes into designing and building a new data center. For example, a broad variety of factors are considered when planning a new data center including, e.g., climate patterns, pollution, access to water, power, and other resources. Often, models or simulations are performed to compare these (and other factors) for potential sites when planning a data center. For example, a designer may perform simulations to determine how environmental factors will impact a given data center design and plan the data center for the "worst case scenario" based on the simulations.

In addition to fixed-location data centers which require the type of advanced planning described above, some data centers have been designed to be more mobile. For example, a "Containerized Data Center"—also referred to as a "modular data center" or "data center-in-a-box"—provides a self-contained data center that can be moved (with varying degrees of effort) from one location to another. Similarly, modular data centers are being designed where the size of the data center can grow (or shrink) by adding (or removing) modular data center modules.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DESCRIPTION

Overview

One embodiment described herein includes a method to optimize data center operations. This method may generally include receiving a description of environmental conditions forecasted to occur during an upcoming operational cycle for each of one or more mobile data centers and determining a computing load to assign to at least a first one of the mobile data centers. The computing load assigned to the first one of the mobile data centers optimizes one or more operational metrics for the one or more mobile data centers during the upcoming operational cycle.

Additional embodiments include a computer readable storage medium, storing a program configured to perform the aforementioned method, and a system having a processor and a memory storing a program configured to perform the aforementioned method.

DESCRIPTION OF EXAMPLE EMBODIMENTS

Containerized or modular centers may be deployed to create (or add) data center capacity to a data center network. A data center container is frequently faster to deploy than a traditional data center. The container itself generally provides a modular, portable, self-contained computing environment that can be shipped and deployed virtually anywhere. As the container itself is portable, it may be located or deployed to non-conventional locations, such as urban spaces or to a data center configured to be extendable through the use of modular components. While containerized data centers provide many advantages to an IT deployment model, they also bring several challenges, such as an increase in the complexity of thermal management. This occurs as data center containers are often stationed in open or uncontrolled environments and need to use external cooling and power means sufficient to operate in whatever operating environment is encountered upon deployment.

Embodiments presented in this disclosure provide techniques used to evaluate compute and/or thermal loads, among other things, to aid in managing a collection of one or more containerized or modular data centers. For example, embodiments of the invention may use forecasts (or real-time measurements) of environmental factors as well as projected computing demands to tailor the compute load, cooling strategy, power demands (or other metric of data center operations) for a network of containerized or modular data centers. Doing so allows an operator of such a data center network to manage specific operational goals in real time.

As noted, current practice for designing a data center is to simulate environmental factors prior to construction center and then to plan the data center to be capable of handling the worst-case scenario based on the simulations. However, the portability of data center containers generally precludes the ability to do this kind of forecasting and planning. For example, containerized data centers may need to be deployed to virtually anywhere in unpredictable ways with little or no prior planning (e.g., in response to an emergency or otherwise unforeseen local computing demands). Embodiments may be used to optimize a data center network, regardless of the particular deployment of a set of containerized data centers. As described in greater detail below, near term forecasts (or other real-time measurements) may be used to determine an optimized operational state for the data center network.

Generally, the term "optimization" is used herein to describe a change in the state of network data center operations that is superior to other states, usually in terms of power consumption, operating costs, computing loads or other metrics. Note, however, embodiments of the invention are not required to identify an optimal, or best, solution to configure a network of one or more data center containers. Instead, the term optimization generally refers to finding acceptable solutions to difficult problems in a reasonable amount of time.

Additionally, the following description is presented to enable one of ordinary skill in the art to make and use the proposed techniques. Descriptions of specific embodiments and applications are provided only as examples and various modifications will be readily apparent to those skilled in the art. The general principles described herein may be applied to other embodiments and applications without departing from the scope of the disclosure. Thus, the present disclosure is not to be limited to the embodiments shown, but is to be accorded the widest scope consistent with the principles and features described herein. For purpose of clarity, features relating to technical material that is known in the technical fields related to the proposed ideas have not been described in detail.

Figure 1:
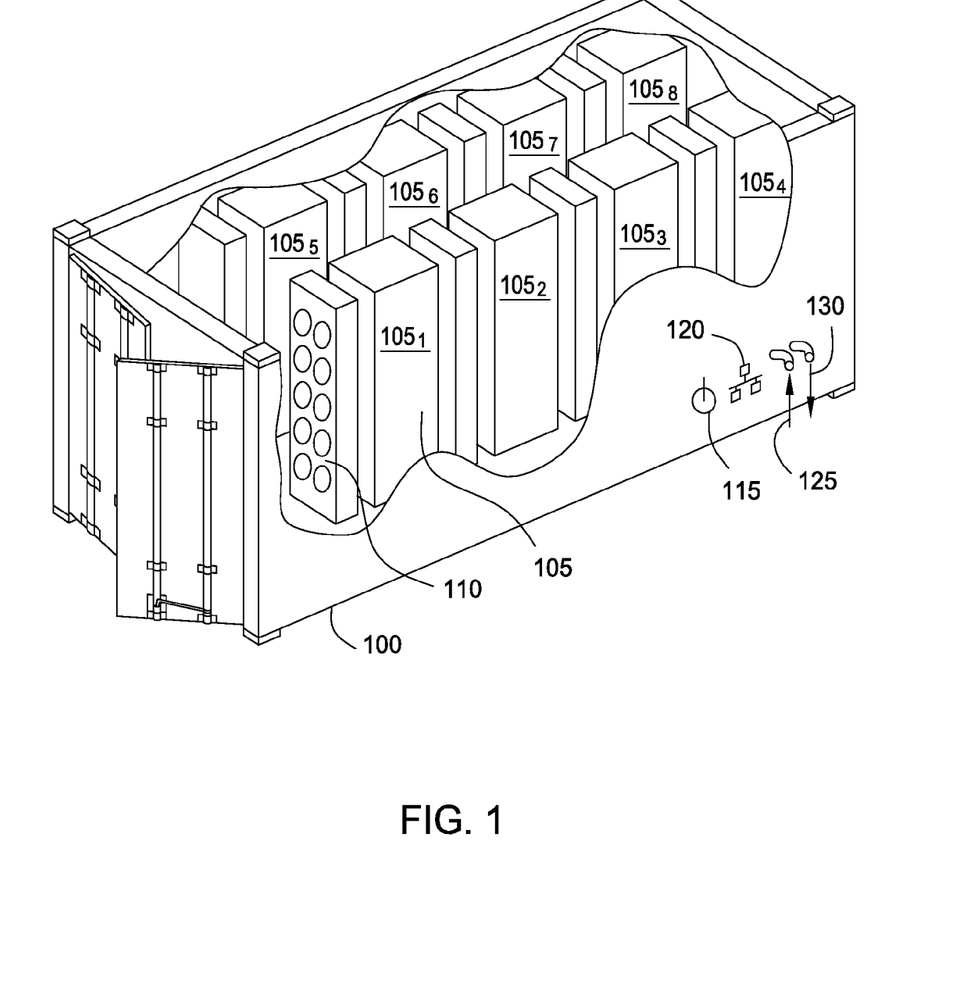
FIG. 1 illustrates an example of a mobile data center, according to certain embodiments of the present disclosure.

FIG. 1 illustrates an example of a mobile data center, according to certain embodiments of the present disclosure. More specifically, FIG. 1 illustrates an example of a data center 100 built into a standard shipping container. Thus, containerized data center 100 may be built into in a 20-foot or 40-foot shipping container and configured with high-density servers and data storage equipment. This approach provides a way for companies to add computing capacity quickly to an existing data center or to rapidly bring computing power into the field. That is, building a data center into a standard shipping container greatly enhances the portability of a mobile data center, as the data center 100 may be transported via rail, ship or truck just like any other shipping container to virtually anywhere.

Upon reaching a deployment site, the data center 100 may be connected to power, communications, and possibly water lines (for cooling) and the computer systems stored in the container powered-up and initialized for use.

Illustratively, the containerized data center 100 includes server racks 105, cooling systems 110, power connections 115, network connections 120, inlet 125 and outlet 130. In this example, server racks 105 each house a number of computing systems. While the actual density may vary depending on the design, containerized data centers typically provide hundreds of individual computer systems, each with a processor, memory and connections to local or shared storage. In addition, the server racks typically include network connections used to connect the computer servers to a data center network. In turn, the data center network itself may be connected to other data networks using network connection 120.

Cooling fans 110 are used to dissipate heat generated by the servers housed by server racks 105. Depending on the design, cooling may be provided by a water cooling system, e.g., (possibly chilled) water may be pumped in through inlet 125 where it absorbs heat generated by operation of the data center server systems and then exits through outlet 130. Alternatively (or additionally) the data center 100 may include a refrigeration unit used to force cooled air into the data center 100. For example, data center 100 may be a refrigerated container (commonly referred to as a "reefer"), which includes integrated conditioning unit(s) used to cool the interior of the container.

However, regardless of the design, the cooling requirements for containerized data center 100 will depend on both the computing load assigned to the server systems and the ambient conditions where the data center 100 is deployed. For example, a data center deployed to a warmer location may have greater cooling requirements than a data center deployed to a cooler location (assuming comparable computing loads). Embodiments of the invention may be used to manage cooling (and other) operational metrics of the data center. For example, forecasted (or real-time) environmental conditions where the containerized data centers are deployed, compute loads that need to be distributed, and/or the cost/availability of resources (e.g., water and power) may be evaluated to determine how to distribute the compute load to the containerized data centers. Doing so allows the data center operator to optimize some metric of data center operation (e.g., power consumption).

Further, in one embodiment, the evaluation may occur in real-time, allowing computing loads to be moved from one data center to another. Assume the network of computerized data centers is used to host multiple tenant applications running logically segmented virtual machines. For example, an enterprise may host applications in servers at a containerized data center. Or a network operator could provide on-demand or cloud computing resources to customers (whether internal or external to an enterprise managing the data center network) hosted by a network of one or more containerized data centers. Note, "cloud computing" generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources in "the cloud," without regard for the underlying physical systems (or locations of those systems) used to provide the computing resources.

In context of the present disclosure, a network operator could provide cloud computing resources to a user (e.g., storage, data, applications, and complete virtualized computing systems) ultimately hosted at containerized data center 100, while at the same time managing the distribution of hosted virtual machines and applications among different containerized data centers within the data center network managed by the network operator.

Figure 2:
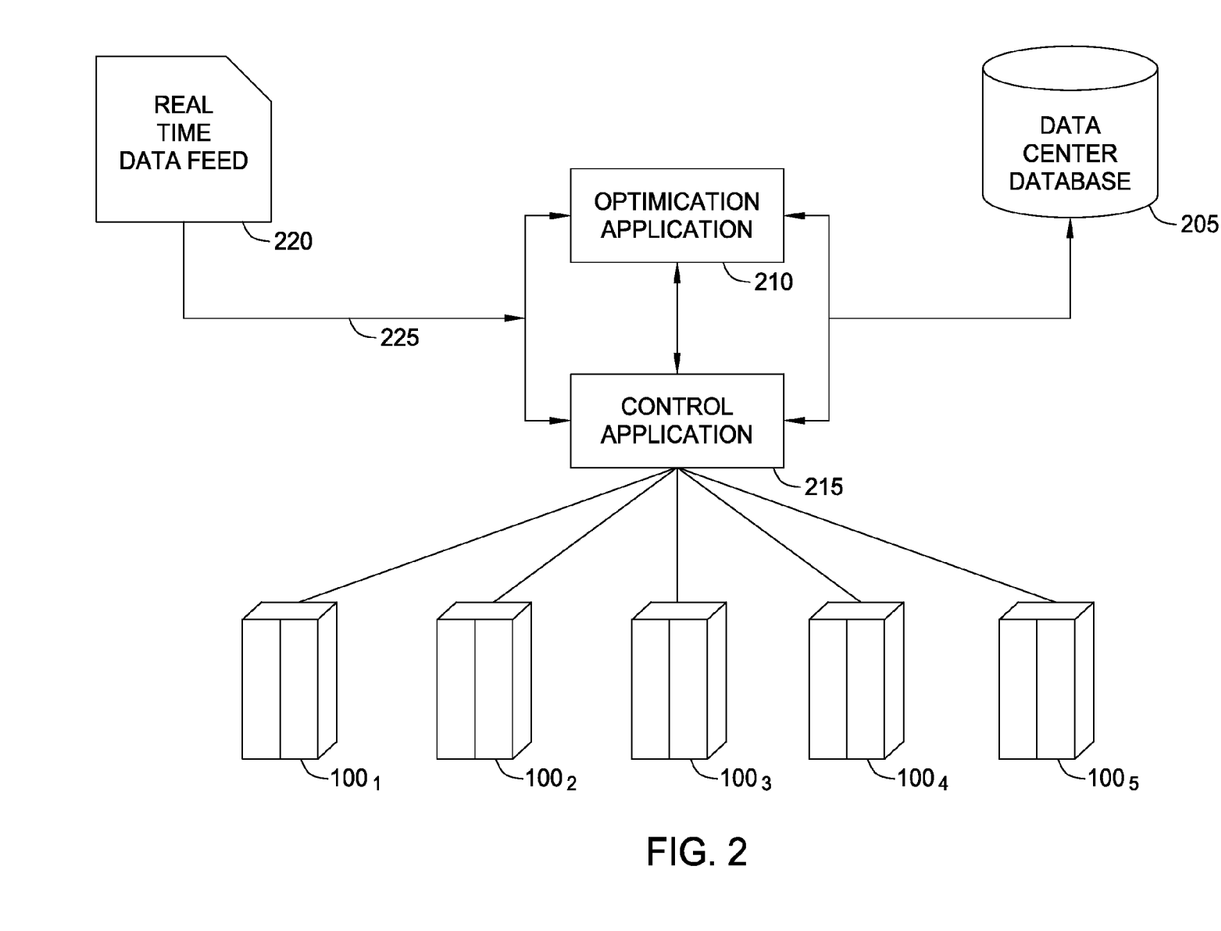
FIG. 2 illustrates a set of functional components used to manage a network of mobile data centers, according to certain embodiments of the present disclosure.

FIG. 2 illustrates a set of functional components used to manage a network of mobile data centers, according to certain embodiments of the present disclosure. Illustratively, the functional components includes a data center database 205, an optimization application 210, a control application 215, a real time data feed 220 and communication links 225. In one embodiment, the optimization application 210 and control application 215 are used to manage a collection of containerized data centers $100_{1-5}$. For example, the control application may be configured to distribute computing loads among the containerized data centers $100_{1-5}$ to optimize a metric of data center operations. To this end, the data center database 205 stores information describing each of one or more data centers in a data center network (e.g., each of the containerized data centers $100_{1-5}$). For example, the data center database 205 may provide a physical location, compute capacity, current compute loading, thermal cooling capability, an estimate of the 'greenness' of each data center's energy source, earthquake risks, power costs along any other data used to optimized data center operational metrics in a particular case.

The optimization application 210 may be configured to optimize one or more metric(s) either locally or globally. That is, the optimization may be performed across the complete network of containerized data centers $100_{1-5}$ or used to optimize the operations at a specific one of the containerized data centers $100_{1-5}$. Examples of the operational metric include reducing a 'carbon footprint' with a containerized data center 100 (or the complete network of data centers $100_{1-5}$), reducing cooling requirements, load balancing compute power, increasing redundancy or failover capacity, etc.

Control application 215 may provide a software application configured to manage the cooling systems, sensors and compute/storage resources at one of the containerized data centers, i.e., to implement optimizations identified by the optimization application. In one embodiment, a control application 215 may be collocated at each individual containerized data centers $100_{1-5}$. Alternatively, a single control application may be located at, e.g., at a network control center, and used to oversee each of the containerized data centers $100_{1-5}$.

Data feed 220 provides a source environmental data for the locations at which the containerized data centers $100_{1-5}$ have been deployed. The Data feed 220 may include both forecasted and real-time data. For example, forecasts may include forecasts of weather, pollution or real-time data regarding currently issued pollution alerts, severe weather alerts, seismic, volcanic or other hazardous alerts such as a tsunami, etc. Further, in one embodiment, some data provided by the real time data feed 220 may be supplied by the containerized data centers $100_{1-5}$. For example, some environmental conditions (e.g., ambient temperature) may be measured by sensors at each containerized data centers $100_{1-5}$ and transmitted back to the optimization application 210. Thus, in addition to forecasted conditions, the optimization application 210 may also rely on real-time data provided by the containerized data centers 100 directly.

Communication links 225 provide a means of interconnecting the data center database 205, the optimization application 210, the control application 215 and the sources of environmental data. Such means include networking, SOAP, XML messages, RSS feeds, client server API's or a variety of other means known in the art.

Figure 3:
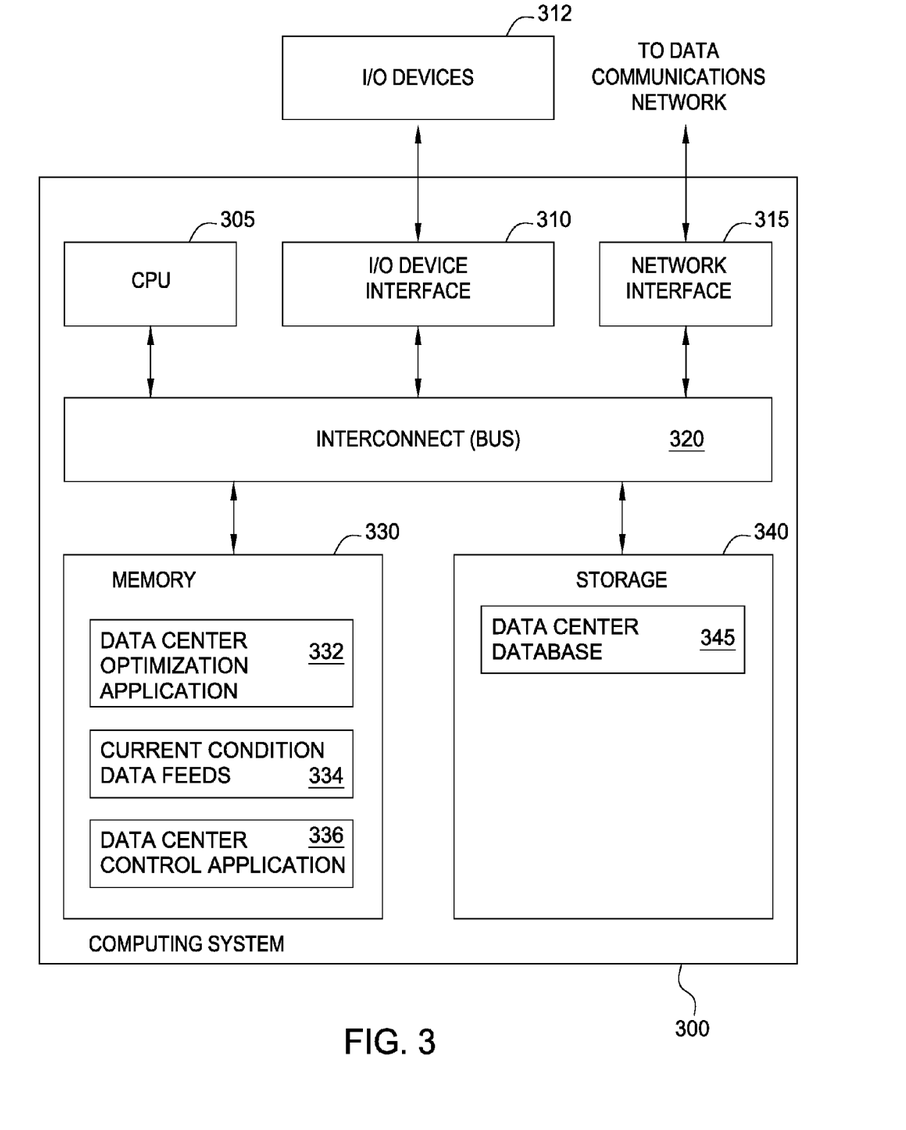
FIG. 3 illustrates a computing system used to manage a network of mobile data centers, according to certain embodiments of the present disclosure.

FIG. 3 illustrates a computing system 300 used to manage a network of mobile data centers, according to certain embodiments of the present disclosure. As shown, the computing system 300 includes, without limitation, a central processing unit (CPU) 305, a network interface 315, an interconnect 320, a memory 330, and storage 340. The computing system 300 may also include an I/O device interface 310 connecting I/O devices 312 to the computing system 300 (e.g., a keyboard, mouse, and display screen).

The CPU 305 retrieves and executes programming instructions stored in the memory 330. Similarly, the CPU 305 stores and retrieves application data residing in the memory 330. The interconnect 320 facilitates transmission, such as programming instructions and application data, between the CPU 305, I/O devices interface 310, storage 340, network interface 315, and memory 330. CPU 305 is included to be representative of a single CPU, multiple CPUs, a single CPU having multiple processing cores, and the like. And the memory 330 is generally included to be representative of a random access memory. The storage 340 may be a disk drive or solid state (SSD) storage drive, or some form of network based storage (e.g., network drives mounted using SMB, CIFS, NFS, etc., or a link to a storage area network (SAN), etc.).

Illustratively, the memory 330 includes a data center optimization application 332, data feeds 334, and data center control application 336. And the storage 340 stores a data center database 345. The data center optimization application 332 provides a software application configured to optimize an operational metric of data center operations, as described above. As such, the optimization application 334 may obtain the current environmental forecasts from the data feeds 334 along with any real time measurements of environmental conditions then present at a given containerized data center. The optimization application 334 may also obtain information describing the individual containerized data centers in a data center network from the database 345, as described above. Using the information from data feeds 334 and database 345, the optimization application 334 may determine changes in compute loads, power sources, cooing settings, etc. Further in one embodiment, the optimization application 332 may be configured to determine whether to deploy (or redeploying) a containerized data center at different locations.

Note however, while the optimization application 332, data feeds 334, and control application 336 and data center database 345 are shown executing on a single computing system, one of ordinary skill in the art will recognize that the functional components illustrated in FIG. 2 and corresponding software applications shown in FIG. 3 may be implanted in a variety of way. For example, in one embodiment, the optimization application 332, data feeds 334, and control application 336, and data center database 345 may be software applications executing on distinct computing systems which communicate using a variety of available data communication protocols.

Figure 4:
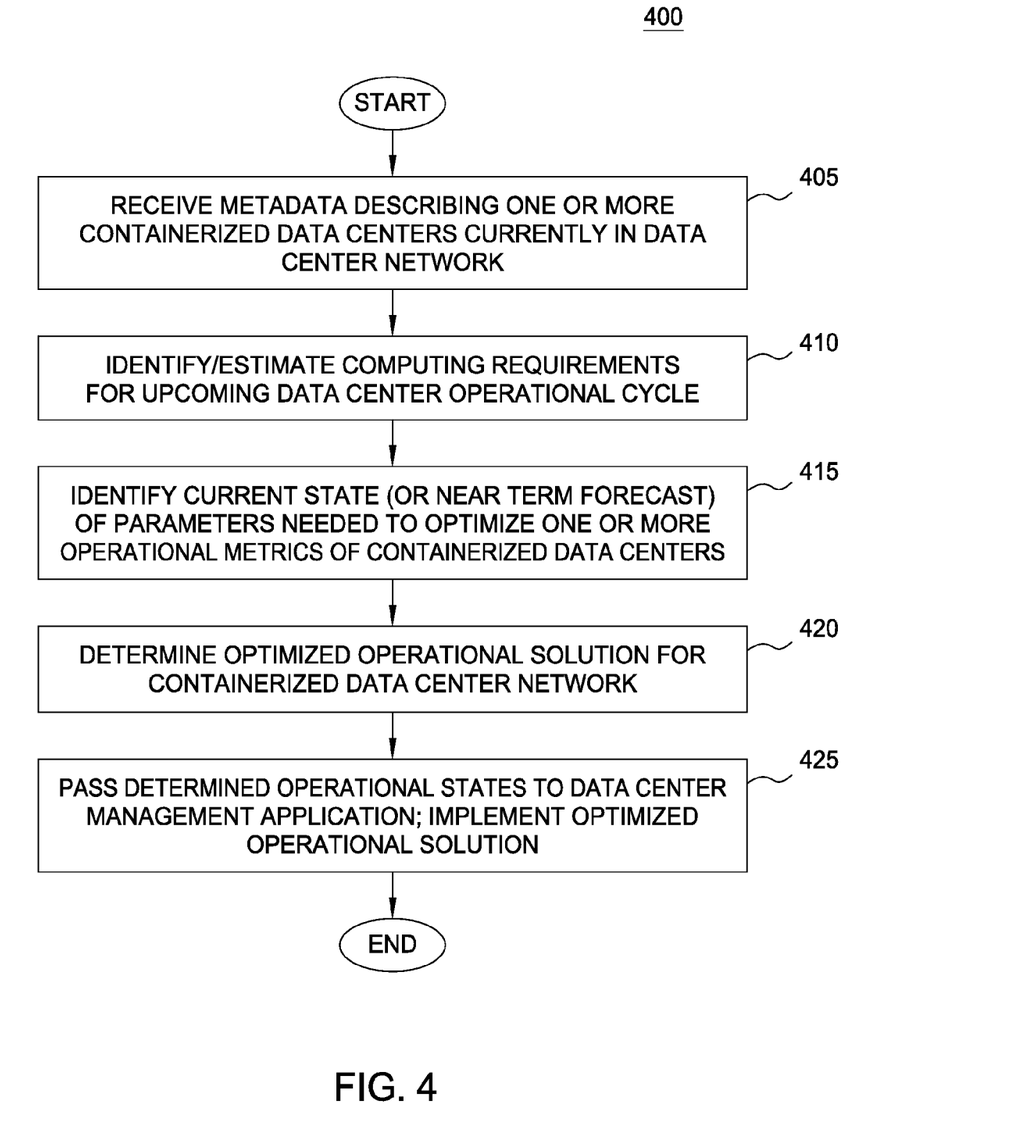
FIG. 4 illustrates a method for managing a network of one or more mobile data centers, according to certain embodiments of the present disclosure.

FIG. 4 illustrates a method 400 for managing a network of one or more mobile data centers, according to certain embodiments of the present disclosure. As shown, the method 400 begins at step 405 where the data center optimization application retrieves information characterizing one or more data centers currently deployed (or deployable) in a data center network, e.g., the present location at which a given container has been deployed (or a location where it currently is) or where it may be deployed), the current computing loads (if any) assigned to a given data center.

At step 410, the optimization application may obtain or identify the computing loads that are available to assign to the network of one or more data centers during an upcoming operational cycle (as characterized by the information retrieved in step 405). That is, the optimization application may identify a computing load that needs to be distributed (or redistributed) across multiple data centers for an upcoming time period. For example, the optimization application may be configured to run for each operational cycle—such as an upcoming period of hour or days, etc. In the case of a single containerized data center, the optimization application may determine how much of the available computing should be assigned for the upcoming operational cycle (possibly deferring some computing tasks for future operational cycles), in order to optimize a metric of data center performance (e.g., power consumption). For example, some computing tasks could be shifted to nighttime, where cooling costs may be lower. In such a case, the available computing loads that need to be assigned may also be associated with metadata indicating whether a given task can be delayed.

At step 415, the optimization application obtains a near-term forecast of the relevant environmental conditions needed to optimize the operational metrics for the network of containerized data centers. Additionally, the optimization application may also obtain the current real-time value for environmental conditions then present at a data center (e.g., the outside and inside temperatures of a containerized data center).

After obtaining the relevant computing loads, forecasts of environmental conditions, and current conditions at deployed data centers, the optimization application determines (at step 420) an optimized operational solution for one or more containerized data centers in the data center network for a given one or more optimized metric(s). While a variety of optimization strategies may be used, in one embodiment, a Pareto Optimization approach may be used; as another example, the well-known Greedy Algorithm may be used to efficiently distribute computing workloads. For example, the optimization application may determine a distribution of virtual machine images across a set of containerized data centers that minimizes the cooling requirements or power consumption needed to operate the data center network. Or the optimization application may move applications or virtual machine images hosted by a first data center to another data center, in response to ambient temperate at the first data center exceeding a threshold. Of course, the actions performed to optimize a given operational metric may depend on the particular metric and the configurable systems at a data center (or network of data centers). At step 425, the optimized operational solution determined by the optimization application is passed to the control application, which then implements the solution. As noted above, the optimizations may be made relative to a single containerized data center, a group of such data centers, or a complete data center network—which can include both containerized and fixed location data centers. In the case of a single containerized data center, the optimization application may determine a computing load to assign to that data center for the operational cycle being optimized.

Thus, as described, embodiments presented in this disclosure provide techniques used to evaluate compute and/or thermal loads, among other things, to aid in managing a collection of one or more containerized or modular data centers. For example, embodiments of the invention may use forecasts (or real-time measurements) of environmental factors as well as projected computing demands to tailor the compute load, cooling strategy, power demands (or other metric of data center operations) for a network of containerized or modular data centers. Doing so allows an operator of such a data center network to manage specific operational goals in real time.

While the forgoing is directed to embodiments of the present disclosure, other and further embodiments of the disclosure may be devised without departing from the basic scope thereof. For example, aspects of the present disclosure may be implemented in hardware or software or in a combination of hardware and software. One embodiment of the disclosure may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present disclosure, are embodiments of the present disclosure.

In view of the foregoing, the scope of the present disclosure is determined by the claims that follow.

I claim:

1. A computer-implemented method, comprising:
receiving a current description of real-time environmental conditions forecast to occur during an upcoming operational cycle for each of a plurality of mobile data centers, wherein the current description of environmental conditions include weather conditions forecasted to occur at a physical location of each of the mobile data centers;
receiving a compute capacity, a real-time current compute load, and a thermal cooling capability of at least a first one of the mobile data centers; and
determining a computing load to assign to at least the first one of the mobile data centers, wherein the computing load assigned to the first one of the mobile data center optimizes one or more operational metrics for one or more of the plurality of mobile data centers during the upcoming operational cycle based on the received real-time forecast of environmental conditions.

2. The computer-implemented method of claim 1, further comprising:
receiving a measurement of an environmental condition from the first mobile data center.

3. The computer-implemented method of claim 2, wherein the measurement provides at least one of a temperature inside the first mobile data center and an ambient temperature surrounding the first mobile data center.

4. The computer-implemented method of claim 1, wherein the plurality of mobile data centers each comprise a shipping container configured with a collection of server computing systems.

5. The computer-implemented method of claim 1, wherein the operational metric minimizes cooling requirements for the first data center.

6. The computer-implemented method of claim 1, wherein the operational metric minimizes cooling requirements across the plurality of mobile data centers.

7. The computer-implemented method of claim 1, wherein determining a computing load to assign to the first mobile data center comprises determining one or more virtual machine instances or applications to be hosted at the first mobile data center.

8. A non-transitory computer-readable storage medium storing code for execution by a processor, wherein the code, when executed by the processor, performs an operation, comprising:
receiving a current description of real-time environmental conditions forecast to occur during an upcoming operational cycle for each of a plurality of mobile data centers, wherein the current description of environmental conditions include weather conditions forecasted to occur at a physical location of each of the mobile data centers;
receiving a compute capacity, a real-time current compute load, and a thermal cooling capability of at least a first one of the mobile data centers; and
determining a computing load to assign at least the first one of the mobile data centers, wherein the computing load assigned to the first one of the mobile data center optimizes one or more operational metrics for one or more of the plurality of mobile data centers during the upcoming operational cycle based on the received forecast of environmental conditions.

9. The non-transitory computer-readable storage medium of claim 8, wherein the operation further comprises comprising:
receiving a measurement of an environmental condition from the first mobile data center.

10. The non-transitory computer-readable storage medium of claim 9, wherein the measurement provides at least one of a temperature inside the first mobile data center and an ambient temperature surrounding the first mobile data center.

11. The non-transitory computer-readable storage medium of claim 8, wherein the plurality of mobile data centers each comprise a shipping container configured with a collection of server computing systems.

12. The non-transitory computer-readable storage medium of claim 8, wherein the operational metric minimizes cooling requirements for the first data center.

13. The non-transitory computer-readable storage medium of claim 8, wherein the operational metric minimizes cooling requirements across the plurality of mobile data centers.

14. The non-transitory computer-readable storage medium of claim 8, wherein determining a computing load to assign to the first mobile data center comprises determining one or more virtual machine instances or applications to be hosted at the first mobile data center.

15. A system, comprising:
a processor; and
a memory storing management an application program, which when executed on the processor, performs an operation, comprising:
receiving a current description of real-time environmental conditions forecast to occur during an upcoming operational cycle for each of a plurality of mobile data centers, wherein the current description of environmental conditions include weather conditions forecasted to occur at a physical location of each of the mobile data centers,
receiving a compute capacity, a real-time current compute load, and a thermal cooling capability of at least a first one of the mobile data centers, and
determining a computing load to assign to at least the first one of the mobile data centers, wherein the computing load assigned to the first one of the mobile data centers optimizes one or more operational metrics for one or more of the plurality of mobile data centers during the upcoming operational cycle based on the received forecast of environmental conditions.

16. The system of claim 15, wherein the operation further comprises comprising:
receiving a measurement of an environmental condition from the first mobile data center.

17. The system of claim 16, wherein the measurement provides at least one of a temperature inside the first mobile data center and an ambient temperature surrounding the first mobile data center.

18. The system of claim 15, wherein the plurality of mobile data centers each comprise a shipping container configured with a collection of server computing systems.

19. The system of claim 15, wherein the operational metric minimizes cooling requirements for the first data center.

20. The system of claim 15, wherein the operational metric minimizes cooling requirements across the plurality of mobile data centers.

21. The system of claim 15, wherein determining a computing load to assign to the first mobile data center comprises determining one or more virtual machine instances or applications to be hosted at the first mobile data center.

* * * * *

UNITED STATES PATENT AND TRADEMARK OFFICE
CERTIFICATE OF CORRECTION

PATENT NO. : 8,762,522 B2
APPLICATION NO. : 13/089902
DATED : June 24, 2014
INVENTOR(S) : Billy G. Moon It is certified that error appears in the above-identified patent and that said Letters Patent is hereby corrected as shown below:

On the Title Page, Item (73) Assignee:

Please delete "Cisco Technology" and insert -- Cisco Technology, Inc. -- therefor;

In Claims:

Column 8, Claim 1, Line 20, please delete "center" and insert -- centers -- therefor;

Column 8, Claim 8, Line 63, please delete "center" and insert -- centers -- therefor.

Signed and Sealed this
Sixth Day of January, 2015

Michelle K. Lee
*Deputy Director of the United States Patent and Trademark Office*